US012621292B2

(12) United States Patent
Shelef et al.

(10) Patent No.: US 12,621,292 B2
(45) Date of Patent: May 5, 2026

(54) TECHNIQUES FOR SECURING IDENTITY AND ACCESS MANAGEMENT OPERATIONS VIA AGENTS AND RELAYS

(71) Applicant: Oasis Security Ltd., Tel Aviv (IL)

(72) Inventors: Barak Shelef, Tel Aviv (IL); Yonatan Shafrir, Newton, MA (US); Lior Galam, Tel Aviv (IL)

(73) Assignee: Oasis Security Ltd., Tel Aviv (IL)

( * ) Notice: Subject to any disclaimer, the term of this patent is extended or adjusted under 35 U.S.C. 154(b) by 104 days.

(21) Appl. No.: 18/886,046

(22) Filed: Sep. 16, 2024

(65) Prior Publication Data

US 2025/0385901 A1       Dec. 18, 2025

Related U.S. Application Data

(60) Provisional application No. 63/660,033, filed on Jun. 14, 2024.

(51) Int. Cl.
*H04L 29/06* (2006.01)
*H04L 9/40* (2022.01)

(52) U.S. Cl.
CPC ........ *H04L 63/083* (2013.01); *H04L 63/0407* (2013.01)

(58) Field of Classification Search
None
See application file for complete search history.

(56) References Cited

U.S. PATENT DOCUMENTS

| | | | |
|---|---|---|---|
| 7,471,943 | B2 | 12/2008 | Chun et al. |
| 7,505,471 | B2 | 3/2009 | Furukawa et al. |
| 8,533,803 | B2 | 9/2013 | Cha et al. |
| 8,560,366 | B2 | 10/2013 | Mikurak |
| 8,904,181 | B1 | 12/2014 | Felsher et al. |
| 9,165,153 | B2 | 10/2015 | Fielder |
| 9,621,523 | B2 | 4/2017 | Rothstein et al. |
| 9,698,985 | B2 | 7/2017 | McCusker et al. |
| 10,305,914 | B1 | 5/2019 | Brin et al. |
| 10,516,533 | B2 | 12/2019 | Mannan et al. |
| 10,880,089 | B2 | 12/2020 | Brown et al. |
| 11,165,581 | B2 | 11/2021 | Hunt |
| 11,652,627 | B2 | 5/2023 | Wentz |

(Continued)

OTHER PUBLICATIONS

Greenberg et al, Mobile Agents and Security, Jun. 31, 1998, IEEE, pgs. 76-85. (YearL 1998).

(Continued)

*Primary Examiner* — Shin-Hon (Eric) Chen
(74) *Attorney, Agent, or Firm* — M&B IP Analysts, LLC

(57)       ABSTRACT

Systems and methods for secure execution of operations. A method includes executing a control message generated by a system that is external to a computing environment, wherein the control message indicates at least a resource within the computing environment and an operation type of an operation to be performed via the resource, wherein executing the control message includes causing execution the operation via the resource in order to generate operation results data. A secret is removed from a control message response in order to create a secured control message response, wherein the control message response is generated based on the operation results data. The secured control message response is transmitted to the system.

12 Claims, 11 Drawing Sheets

(56) References Cited

U.S. PATENT DOCUMENTS

| | | | | |
|---|---|---|---|---|
| 11,716,312 | B1 * | 8/2023 | McNamara, Jr. | ....... G06F 21/46 |
| | | | | 726/6 |
| 2017/0099281 | A1 * | 4/2017 | Trevathan | ............... G06F 16/86 |
| 2018/0123781 | A1 * | 5/2018 | Ness | .................... H04L 9/0891 |
| 2020/0241941 | A1 * | 7/2020 | Gonczi | .............. H04L 49/3018 |
| 2020/0301727 | A1 | 9/2020 | Aronov et al. | |
| 2022/0014547 | A1 | 1/2022 | Hasan | |
| 2023/0403265 | A1 * | 12/2023 | Gaffney | ............... H04L 67/141 |
| 2024/0176855 | A1 * | 5/2024 | Wadhwa | ................. G06F 21/31 |
| 2024/0204991 | A1 | 6/2024 | Patel et al. | |
| 2025/0126114 | A1 * | 4/2025 | Rajendran | .......... H04L 63/0846 |

OTHER PUBLICATIONS

Ismail, Authentication Mechanisms for Mobile Agents, Apr. 13, 2007, IEEE, pgs. 1-8. (Year: 2007).

* cited by examiner

TECHNIQUES FOR SECURING IDENTITY AND ACCESS MANAGEMENT OPERATIONS VIA AGENTS AND RELAYS

CROSS-REFERENCE TO RELATED APPLICATIONS

This application claims the benefit of U.S. Provisional Application No. 63/660,033 filed on Jun. 14, 2024, the contents of which are hereby incorporated by reference.

TECHNICAL FIELD

The present disclosure relates generally to identity and access management (IAM), and more specifically to cybersecurity for IAM operations.

BACKGROUND

Identity and access management (IAM) is a set of policies, services, and technologies used to control access to and use of digital resources. IAM systems work to keep malicious entities from accessing these resources and to ensure that users have certain permissions to use these resources while placing restrictions on such use. As organizations increasingly turn to cloud computing for their computing needs and the number of identities being managed increases, the need for robust IAM systems which can continuously operate safely remains important.

To ensure that the correct entities are granted access to resources and to ensure that those entities comply with any restrictions or limitations on their use of those resources, IAM techniques include authenticating users in order to verify the identity of the user before granting access. Once a user has been authenticated, access may be controlled based on the identity of the user (e.g., by granting the user the ability to use resources as determined based on their identity).

Authentication may utilize credentials such as identity information (e.g., usernames) and secrets (e.g., passwords). To this end, various IAM solutions use systems to track and maintain these credentials. For example, identity provider systems may maintain information about identities, which users are associated with identities, privileges for identities, and the like. Additionally, secret vaults may store secrets to be used during authentication, and may also keep logs of secret use.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for secure operation execution. The method comprises: executing a control message generated by a system that is external to a computing environment, wherein the control message indicates at least a resource within the computing environment and an operation type of an operation to be performed via the resource, wherein executing the control message includes causing execution the operation via the resource in order to generate operation results data; removing a secret from a control message response in order to create a secured control message response, wherein the control message response is generated based on the operation results data; and transmitting the secured control message response to the system.

Certain embodiments disclosed herein also include a non-transitory computer readable medium having stored thereon causing a processing circuitry to execute a process, the process comprising: executing a control message generated by a system that is external to a computing environment, wherein the control message indicates at least a resource within the computing environment and an operation type of an operation to be performed via the resource, wherein executing the control message includes causing execution the operation via the resource in order to generate operation results data; removing a secret from a control message response in order to create a secured control message response, wherein the control message response is generated based on the operation results data; and transmitting the secured control message response to the system.

Certain embodiments disclosed herein also include a system for secure operation execution. The system acts as a first system. The system comprises: a processing circuitry; and a memory, the memory containing instructions that, when executed by the processing circuitry, configure the first system to: execute a control message generated by a second system that is external to the computing environment, wherein the control message indicates at least a resource within the computing environment and an operation type of an operation to be performed via the resource, wherein executing the control message includes causing execution the operation via the resource in order to generate operation results data; remove a secret from a control message response in order to create a secured control message response, wherein the control message response is generated based on the operation results data; and transmit the secured control message response to the second system.

Certain embodiments disclosed herein include a method, non-transitory computer readable medium, or system as noted above or below, wherein the method is performed by a first agent, wherein the control message has attached relay instructions, wherein the relay instructions indicate a second agent as a destination for the control message, further including or being configured to perform the following step or steps: relaying the control message to the second agent, wherein the second agent executes the control message in order to execute the operation via the resource.

Certain embodiments disclosed herein include a method, non-transitory computer readable medium, or system as noted above or below, wherein the relay instructions further include instructions which cause the operation results data to be returned to the first agent when the relay instructions are executed by the second agent.

Certain embodiments disclosed herein include a method, non-transitory computer readable medium, or system as noted above or below, further including or being configured to perform the following step or steps: identifying a relay queue for relaying the control message to the second agent;

and establishing a connection with the relay queue, wherein the control message is relayed to the second agent via the relay queue.

Certain embodiments disclosed herein include a method, non-transitory computer readable medium, or system as noted above or below, wherein the operation results data is received from the second agent via the relay queue.

Certain embodiments disclosed herein include a method, non-transitory computer readable medium, or system as noted above or below, wherein the method is performed by an agent deployed in the computing environment, wherein the agent is configured such that authentication credentials used by the agent to access the resource remain within a perimeter of the computing environment.

Certain embodiments disclosed herein include a method, non-transitory computer readable medium, or system as noted above or below, wherein the operation is performed with respect to a secret having a secret identifier, further including or being configured to perform the following step or steps: replacing an instance of the secret in the control message response with the secret identifier.

Certain embodiments disclosed herein include a method, non-transitory computer readable medium, or system as noted above or below, wherein the operation is a secret rotation operation, wherein the resource indicated in the control message is a vault, wherein the secret is a second secret, further including or being configured to perform the following step or steps: causing the secret rotation operation to be performed by causing a first secret stored in the vault to be replaced with the second secret, wherein the second secret has a secret identifier indicated in the operation results data, wherein removing the secret from the control message response further comprises: replacing an instance of the second secret in the control message response with the secret identifier.

Certain embodiments disclosed herein include a method for secure operation execution. The method comprises: executing a control message received via a relay queue, wherein the control message indicates at least a resource within the computing environment and an operation type of an operation to be performed via the resource, wherein executing the control message includes executing the operation via the resource in order to generate operation results data; generating a control message response based on the operation results data; and transmitting the control message response via the relay queue.

Certain embodiments disclosed herein also include a non-transitory computer readable medium having stored thereon causing a processing circuitry to execute a process, the process comprising: executing a control message received via a relay queue, wherein the control message indicates at least a resource within the computing environment and an operation type of an operation to be performed via the resource, wherein executing the control message includes executing the operation via the resource in order to generate operation results data; generating a control message response based on the operation results data; and transmitting the control message response via the relay queue.

Certain embodiments disclosed herein include a method, non-transitory computer readable medium, or system as noted above or below, further including or being configured to perform the following step or steps: establishing a connection with the relay queue; receiving the control message via the relay queue; and establishing a connection with the resource when the control message has been received.

Certain embodiments disclosed herein include a method, non-transitory computer readable medium, or system as noted above or below, wherein the operation is performed with respect to a secret having a secret identifier, wherein the control message response is generated such that the control message response includes the secret identifier.

Certain embodiments disclosed herein include a method, non-transitory computer readable medium, or system as noted above or below, wherein the operation is a secret rotation operation, wherein the resource indicated in the control message is a vault, further including or being configured to perform the following step or steps: performing the secret rotation operation by replacing a first secret stored in the vault with a second secret, wherein the second secret has a secret identifier indicated in the operation results data, wherein the control message response is generated such that the control message response includes the secret identifier.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
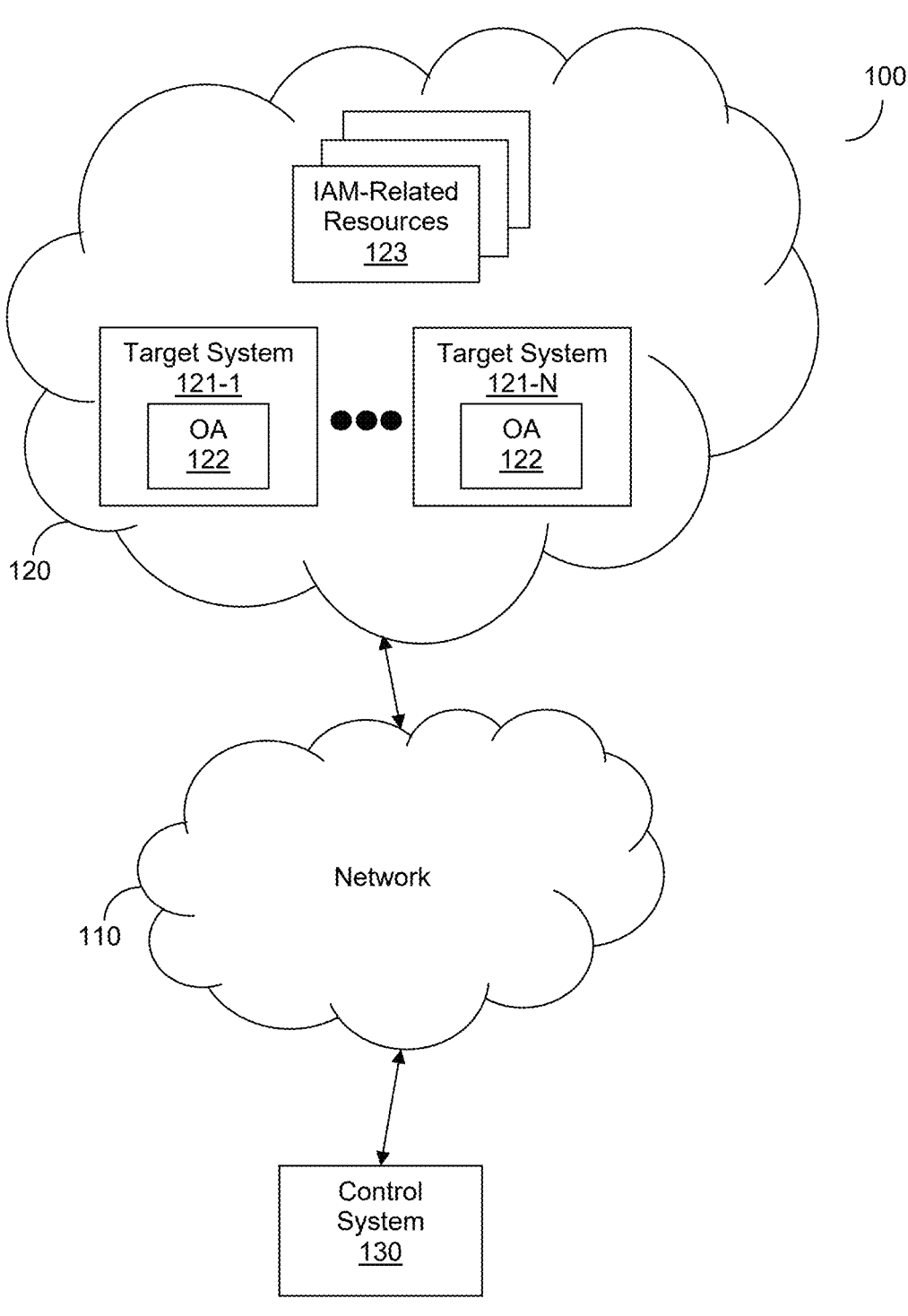
FIG. 1 is a network diagram utilized to describe various disclosed embodiments.

In light of the challenges noted above and having identified that executing identity and access management (IAM) operations in modern computing infrastructures may require synchronization of multiple data sources to achieve a desired state, it has been identified that solutions which allow for centrally controlling at least some aspects of IAM activities would be desirable. For example, secret rotation is an IAM operation which may require generating a secret by an identity provider system and then synchronizing that secret in a separate secret vault. Moreover, automating these processes can be challenging because of the number of data sources involved and security risks which are inherent to controlling IAM operations. Accordingly, various disclosed embodiments provide techniques which enable secure central management of IAM activities.

Further, it has been identified that centralizing IAM activities can be challenging due to network perimeter limitations. In some cases, access to identity providers and/or secret vaults may need to be restricted only to entities within a certain network perimeter. Likewise, proliferation of secrets may need to be restricted outside of a given network perimeter. These challenges and others provide obstacles to SaaS-based solutions or other solutions which would provide central management outside of the network perimeter. As discussed herein, various disclosed embodiments enable centralized control of IAM activities in a secure manner which can allow for such SaaS-based or other remote solutions while maintaining access perimeter and secret perimeters.

The various disclosed embodiments include methods and systems for securing IAM operations using outpost agents. The outpost agents may be or may include software deployed locally in a computing environment (e.g., in a perimeter of a cloud computing environment) which contains IAM-related resources such as identity provider systems and secret vaults. The disclosed embodiments allow for providing centralized control of IAM operations for different IAM-related resources by a system which is external to the computing environment in a secure manner which avoids exposing secrets or other sensitive data to the external system.

To enable secure centralized management in accordance with various disclosed embodiments, various disclosed embodiments utilize a control system which lacks access to certain IAM operations (e.g., secrets-related activities such as commands to rotate secrets in order to replace old secrets with new secrets) and, instead, acts via commands in forms such as control messages sent to outpost agents deployed locally with IAM-related resources which are referenced in the control messages. Additionally, various disclosed embodiments utilize secret identifiers which are detached from their corresponding secrets such that the secret identifiers may be utilized to communicate information about use of the secrets from the outpost agents to the control system without revealing the secrets themselves. Some embodiments additionally utilize queues to relay control messages between outpost agents in a peer-to-peer manner, which further aids in providing centralized control and may allow for outpost agents to share secrets with each other and without sharing those secrets with the control system.

Example IAM operations which may be managed in accordance with various disclosed embodiments may include, but are not limited to, rotating secrets for identities, provisioning a new secret for an existing identity, provisioning new identities, storing secrets in secret vaults, moving a secret stored in one vault to another vault, provisioning new vaults, disabling secrets, deleting secrets, disabling identities, deleting identities, deleting vaults, modifying properties of identities, modifying identity policies, modifying properties of vaults, modifying vault policies, and the like.

The various disclosed embodiments may allow for executing IAM operations remotely, for example via one or more remote systems as part of a service offered via a Software-as-a-Service (SaaS) model. Moreover, the operations may be executed while avoiding or otherwise minimizing unnecessary exposure of resources such as secrets managers or vaults, or of underlying data such as secrets held by secrets managers or intermediate data generated as part of executing operations. That is, various disclosed embodiments allow for executing operations remotely while improving security of such remotely executed operations.

More specifically, operations may be executed remotely within a computing environment without requiring an operator of the computing environment to provide resource write access or otherwise without requiring the operator to provide privileged credentials for resources in the computing environment. As a non-limiting example, various disclosed embodiments may be realized without providing a key used as an authentication credential for a secrets manager to a server issuing command messages remotely.

Likewise, various disclosed embodiments may be utilized to enable remote operations without exposing the resources that perform those operations to be exposed directly to the Internet or otherwise to external entities outside of a computing environment in which those resources are to be deployed. As a non-limiting example, a server issuing command messages remotely may cause execution of operations via a secrets manager without needing to directly access the secrets manager or otherwise requiring the secrets manager to be connected to the server via the Internet.

Additionally, various disclosed embodiments may be utilized to realize remotely executed operations without exposing intermediate data or data otherwise created during execution of such operations to external systems (e.g., a server or other system issuing command messages from outside of a computing environment in which the operations are being executed). In this regard, it is noted that data which is created as part of executing an operation and which is used for the operation may contain information which might be utilized for malicious purposes such that it may be desirable to prevent such intermediate information from being provided to external systems. As a non-limiting example, an operation for creating a new service account may be executed based on a command message received from a server deployed outside of the computing environment, and the server will not be exposed to any secret tokens generated as part of creating the new service account.

FIG. 1 shows an example network diagram 100 utilized to describe the various disclosed embodiments. In the example network diagram 100, a computing environment 120 and a control system 130 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The computing environment 120 is an environment in which identity and access management (IAM) activities (e.g., IAM operations) occur. To this end, in accordance with various disclosed embodiments, the computing environment 120 includes one or more target systems 121-1 through 121-N (where N is an integer having a value equal to or greater than 1) and IAM-related resources 123. The computing environment may be or may include a cloud computing environment.

The target systems 121 may be utilized to realize at least a portion of the disclosed embodiments. More specifically, as discussed herein, a central control system such as the control system 130 may orchestrate IAM activities within the computing environment via the target systems by sending control messages for execution and relay. To this end, in an embodiment, each of the target systems 121 includes a respective outpost agent (OA) 122. In an embodiment, each outpost agent is realized as a set of computer-executable instructions that, when executed by a processing circuitry (not shown in FIG. 1), configure the processing circuitry to execute control messages, to relay control messages (e.g., to outpost agents 122 of other target systems 121), both, and the like, for example as discussed further below with respect to FIGS. 7-9. To this end, any or all of the outpost agents may be realized as software applications configured as such. A non-limiting example hardware layer which may be utilized to realize any of the target systems 121, any of the outpost agents 122, or both, is described further below with respect to FIG. 11.

Such a control message may be transmitted by the control system 130 to one of the outpost agents 122 of a first target system (e.g., the target system 121-1). The outpost agent 122, in turn, may either execute the control message or relay the control message to an outpost agent of a second target system (e.g., the target system 121-2). Control messages may be further relayed between outpost agents of different target systems, as needed, in order to reach a destination outpost agent via chains of relays.

In an embodiment, a control message contains data to be used to execute an IAM operation by one of the outpost agents 122. Such data may indicate, but is not limited to, a target IAM-related resource (e.g., a target identity provider system or vault) on which the IAM operation is to be performed, identifiers of entities on which the IAM operation is to be performed (e.g., entities such as secrets, policies, vaults, identities, etc.), accompanying data to be used while executing the IAM operation (e.g., names and values to give to objects during execution of the IAM operation), combinations thereof, and the like. In a further embodiment, the control message may have attached thereto relay instructions to be used for relaying the message from an outpost agent 122 that receives the control message to another outpost agent 122 for execution. In some embodiments, each control message may exclude or otherwise lack certain information which is managed by the outpost agents 122 such as, but not limited to, an indication of what information should be returned in a response to a control message, credentials for IAM-related resources, and the like.

The IAM-related resources 123 include resources on which IAM operations may be performed or which may otherwise be impacted by IAM activities. Such an IAM operation may be utilized to modify, replace, update, provision, disable, delete, or otherwise control IAM-related credentials such as identities and secrets. Additionally, IAM operations may be utilized to control, provision, modify, delete, or otherwise change deployment of secret vaults, policies, and the like. Non-limiting example IAM operations include rotating secrets for an existing identity, provisioning a new secret for an existing identity, provisioning a new identity with a corresponding new secret, storing a secret in a vault, moving a secret stored in one vault into another vault, provisioning a new vault, disabling or deleting a secret for an identity, disabling or deleting an identity, deleting a secret stored in a vault, deleting a vault, modifying a property of an identity, modifying an identity policy, modifying a property of a vault, modifying a vault policy, combinations thereof, and the like.

Non-limiting example IAM-related resources 123 include identity provider systems, secret vaults, and the like. An identity provider system may be configured to manage and authenticate digital computer identities. Such an identity provider system may further be configured to manage auxiliary identity information, secrets, policies, and properties. A secret vault, also referred to as a secret manager, is configured to store and retrieve secret data such as, but not limited to, passwords, tokens, keys, and the like. Secret vaults may be utilized in order to securely share secrets of identities used for authentication between computing workloads.

As discussed herein, the control system 130 may act as a central control system for IAM operations within the computing environment 120. Moreover, the control system 130 may be operated by an entity that does not own or operate the computing environment 120, for example, a software-as-a-service (SaaS) cybersecurity service provider. As noted herein, the outpost agents 122 may be utilized to execute IAM operations based on control messages from the control system 130 in order to enable the control system 130 to orchestrate IAM activities within the computing environment 120 without exposing IAM credentials such as secrets to the control system 130, thereby allowing for convenient but secure control over IAM operations in the computing environment 120.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

Figure 2:
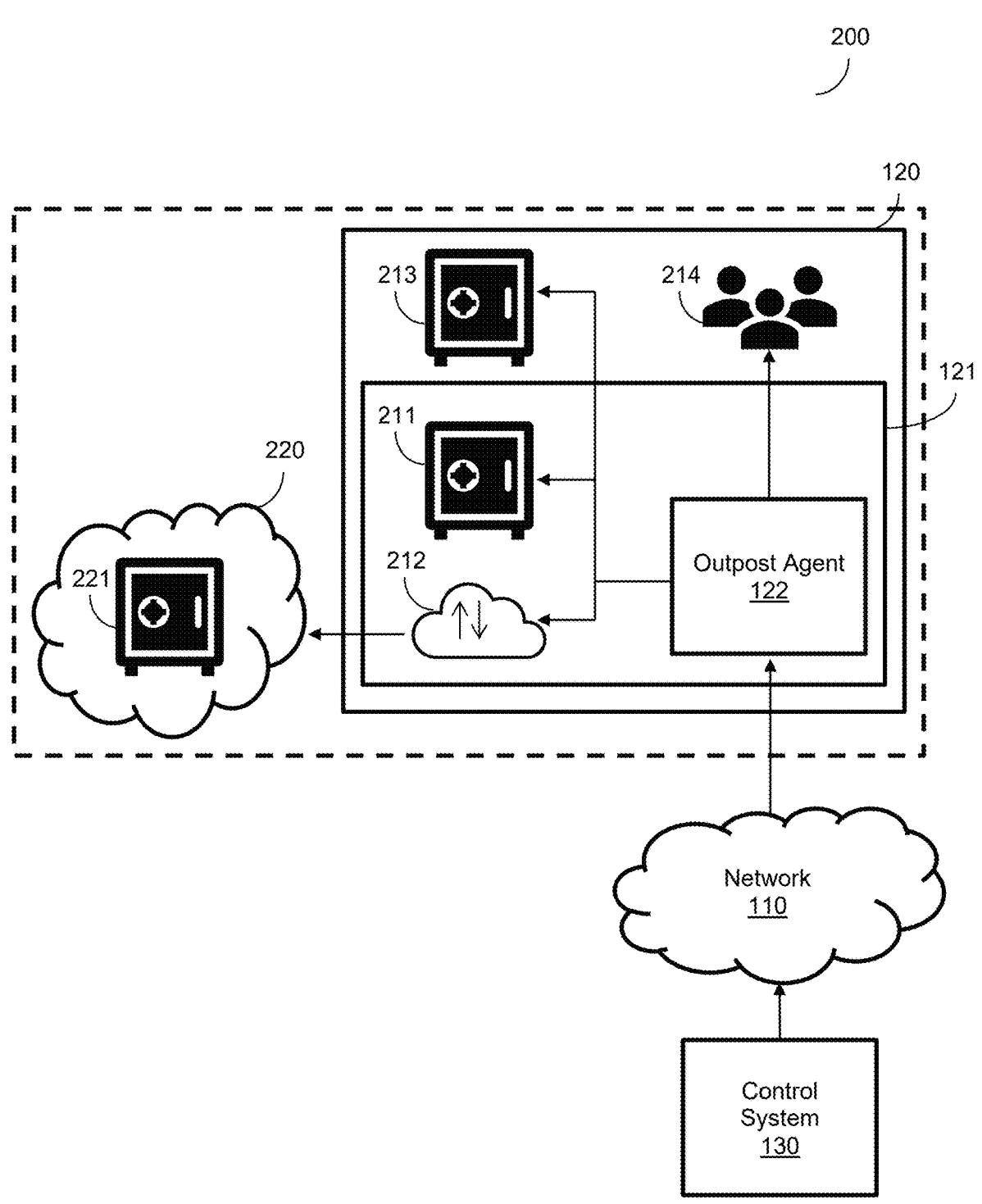
FIG. 2 is an architecture diagram utilized to describe various disclosed embodiments.

FIG. 2 is an architecture diagram 200 utilized to describe various disclosed embodiments.

As shown in FIG. 2, the control system 130 communicates with the target system 121 via the network 110. As depicted in FIG. 2, the target system 121 includes the outpost agent 122, a vault 211, and a gateway 212. In the non-limiting implementation depicted in FIG. 2, the vault 211 is a cloud-hosted vault integrated into the target system 121. The gateway 212 may be, but is not limited to, a virtual private network (VPN) gateway used to communicate data, for example, to send secrets to an on-premises network 220 for storage in an on-premises vault 221. The outpost agent 122 may further be configured to send secrets to a vault 213 which may be, but is not limited to, a cloud native vault 213 deployed in the computing environment 120 or in another computing platform in which the target system 121 is deployed. Likewise, an IAM platform 214 may be deployed natively in such a computing platform 120.

In accordance with various disclosed embodiments, the outpost agent 122 may be configured to manage identities and secrets permissions; may be configured to and have permissions to perform read and write actions on the vaults 211, 213, and 221; and may be configured such that permissions never leave the perimeter (e.g., a perimeter made up of or otherwise including the computing environment 120 and the on-premises network 220).

A non-limiting example deployment process is now described with respect to FIG. 2. One or more of the vaults 211, 213, and 221 is identified as the vault(s) whose IAM operations are to be managed in accordance with one or more of the disclosed embodiments. The outpost agent 122 is deployed in the target system 121 and connected or routed to a vault network (not shown) which allows the outpost agent 122 to communicate with the identified vault(s) 211, 213, and/or 221.

One of the vaults 211, 213, or 221 may be targeted by the outpost agent 122 for configuration, and the outpost agent 122 may configure the target vault 211, 213, or 221 and grant that vault access to any IAM-related resources. In the example implementation shown in FIG. 2, such IAM-related resources include the IAM platform 214. Accordingly, the target vault 211, 213, or 221 may be granted access to the IAM platform 214. The outpost agent 122 may further target the IAM platform 214 for configuration, and grant the IAM platform 214 access to any other IAM-related resources (e.g., one or more of the vaults 211, 213, and 221) in order to allow the IAM platform 214 to perform one or more IAM operations or activities (e.g., secrets rotation).

Continuing the above example, an example process for secrets rotation using the deployment discussed above is now described with respect to FIG. 2. When a secret is to be rotated by the control system 130 (e.g., after a certain period of time since a last secrets rotation has passed, when the control system 130 receives an alert indicating that a secret may have been exposed, etc.), the control system dispatches a secrets rotation command in the form of one or more control messages to the outpost agent 122.

The outpost agent 122, in turn, may receive such a command through an encrypted and authenticated queue (not depicted in FIG. 2) and, in response to receiving the command, initiates generation of a new secret via the IAM platform 214. Once the new secret has been generated, the outpost agent 122 stores the new secret in one or more of the vaults 211, 213, and 221. The outpost agent 122 may further delete, dismiss, or otherwise remote an old secret which is replaced with the new secret. In at least some implementations, the new secret is never persisted in a storage (not shown) of the outpost agent 122 or otherwise of the target system 121, and the new secret is never transmitted outside of a perimeter including the target system 121 (e.g., a perimeter including the target system 121 and the on-premises network 220).

Once the secret rotation has occurred, the outpost agent 122 may generate and send, to the control system 130, a secret identifier of the new secret. Such a secret identifier may be generated such that the secret identifier cannot be used to reconstruct or otherwise determine the secret, or at least such that reconstruction or determination of the secret is computationally intensive (e.g., such that reconstruction or determination is cost-prohibitive in regard to computational costs). The secret identifier of the new secret may be utilized to identify the new secret, for example, for purposes of subsequent control messages sent by the control system 130 for IAM operations involving the new secret.

Figure 3:
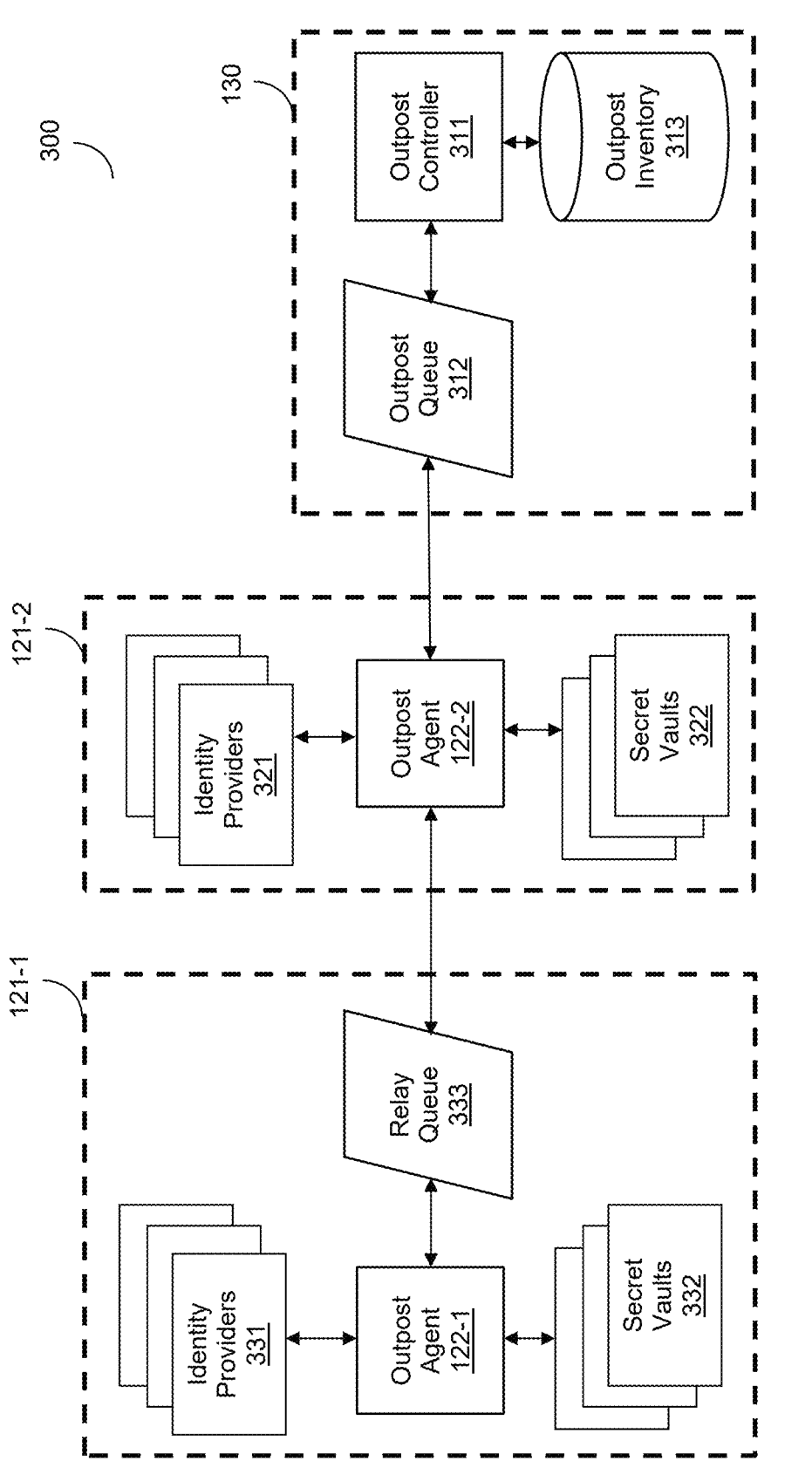
FIG. 3 is a flow diagram illustrating interactions between outposts and a control system utilized to describe various disclosed embodiments.

FIG. 3 is a flow diagram 300 illustrating interactions between outposts and a control system utilized to describe various disclosed embodiments. As depicted in FIG. 3, a first target system 121-1, a second target system 121-2, and the control system 130 communicate in order to realize IAM operations in accordance with at least some disclosed embodiments.

As shown in FIG. 3, each of the target systems 121-1 and 121-2 include a respective outpost agent (i.e., the outpost agent 122-1 and 122-2, respectively), a respective set of identity provider systems (i.e., the identity providers 331 and 321, respectively), and a respective set of secret vaults (i.e., the secret vaults 332 and 322, respectively). Also shown in FIG. 3, the target system 121-1 also includes a relay queue 333. It should be noted that a relay queue is only depicted in the target system 121-1 of FIG. 3 for simplicity, but that the target system 121-2 may equally include a relay queue, and any of the target systems 121 may include multiple relay queues, without departing from the scope of the disclosure.

Also shown in FIG. 3, the control system 130 includes an outpost controller 311, an outpost queue 312, and an outpost inventory 313. The outpost controller 311 is configured to control IAM operations by sending control messages to the outpost agent 122-2, the outpost agent 122-1, or both. More specifically, in an example implementation in accordance with the flow diagram 300, the outpost controller 311 may be configured to control IAM operations of the outpost agent 122-2 by sending control messages to the outpost agent

122-2, and may be configured to control IAM operations of the outpost agent 122-1 by sending, to the outpost agent 122-2, control messages with relay instructions attached thereto. In such an example, the relay instructions indicate the outpost agent 122-1 as the destination outpost agent for the relayed control message. When the outpost agent 122-2 receives control messages with relay instructions indicating the outpost agent 122-1, the outpost agent relays those control messages by sending them to the relay queue 333 of the target system 121-1 in which the outpost agent 122-1 is deployed.

To support operations of the control system, the outpost controller 311 maintains data about the outpost agents 122 managed by the outpost controller 311 to an outpost inventory 312. When the outpost controller 311 needs to execute IAM operations via the outpost agents 122, the outpost controller 311 may select outpost agents 122 from among the outpost inventory 312 as target outpost agents to which control messages are sent or as relayed outpost agents to which control messages are to be sent via relay through such a target outpost agent. To this end, the outpost inventory 312 may store, for each outpost agent 122, information such as, but not limited to, IAM-related resources (e.g., identity provider system and secret vaults) connected to the outpost agent 122, other outpost agents 122 that the outpost agent 122 is capable of relaying messages to (e.g., outpost agents which utilize a relay queue accessible by the outpost agent 122), queue information of the outpost agent 122, an indication of availability of the outpost agent 122 to execute operations, a combination thereof, and the like.

The outpost controller 311 is configured to add control messages to be sent to outpost agents 122 selected in this manner to the outpost queue 312, where control messages are stored for sending to outpost agents 122.

Figure 4:
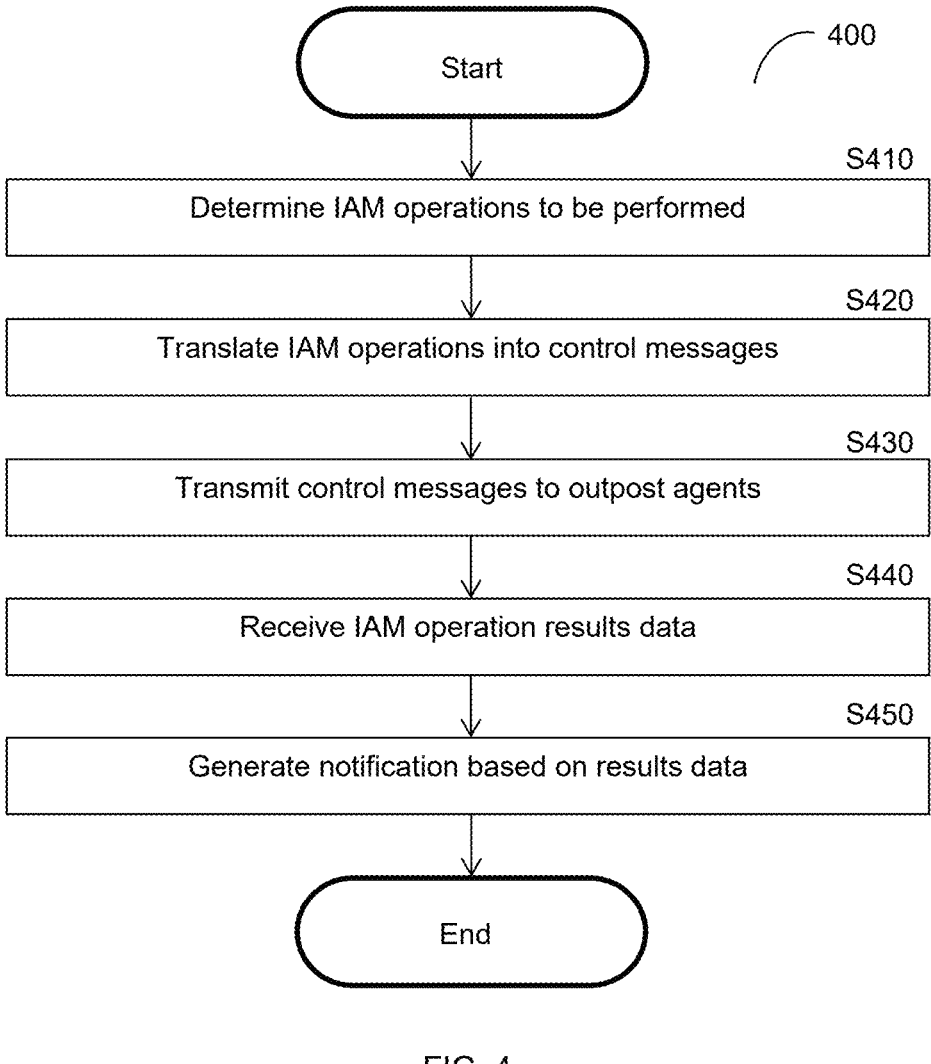
FIG. 4 is a flowchart illustrating a method for controlling identity and access management (IAM) operations using outpost agents according to an embodiment.

FIG. 4 is a flowchart 400 illustrating a method for controlling identity and access management (IAM) operations using outpost agents according to an embodiment. In an embodiment, the method is performed by the control system 130, FIG. 1.

At S410, one or more IAM operations to be performed are determined. The IAM operations may be, but are not limited to, rotating secrets for identities, provisioning a new secret for an existing identity, provisioning new identities, storing secrets in secret vaults, moving a secret stored in one vault to another vault, provisioning new vaults, disabling secrets, deleting secrets, disabling identities, deleting identities, deleting vaults, modifying properties of identities, modifying identity policies, modifying properties of vaults, modifying vault policies, and the like.

At S420, the IAM operations are translated into control messages or portions thereof. Each control message includes instructions for executing a respective IAM operation. The instructions of a control message, when executed via an outpost agent, cause the outpost agent to execute the IAM operation or to relay the control instructions to another outpost agent. In an embodiment, S420 further includes determining an outpost agent for executing the control messages such as, but not limited to, an outpost agent which has access to IAM-related resources which are capable of executing the determined IAM operation.

In an embodiment, the control message is utilized by an outpost agent in order to cause the outpost agent to perform the IAM operation of the control message. To this end, the control message contains data utilized to execute an IAM operation. Such data may include, but is not limited to, a target IAM-related resource (e.g., an identity provider system or vault) on which the operation is to be performed; an identifier of a secret, policy, vault, or identity on which the operation is to be executed; accompanying data for the operation (e.g., names and values to give to objects); relay instructions; a combination thereof, and the like. More specifically, when a control message is to be relayed between outpost agents (e.g., when the system sending the control message lacks direct communications with the outpost agent to execute a given control instruction), the relay instructions may indicate the destination outpost agent to which the control instruction should be relayed and which will execute the IAM operation.

In accordance with various disclosed embodiments, the control messages lack certain information which is managed locally by outpost agents. Such information may include, but is not limited to, information to be returned in responses to the control message, credentials for use in authenticating to IAM-related resources (e.g., identity provider systems or vaults), both, and the like.

An example process for translating an IAM operation into a control message is described further below with respect to FIG. 5.

At S430, the control message is transmitted to an outpost agent. When the control message is received by the outpost agent, the outpost agent executes instructions of the control message, either to execute the IAM operation or to relay the control message to another outpost agent. When the control message is relayed and then received by a destination outpost agent, the destination output agent executes the IAM operation and transmits IAM operation results data back via relay to the system which originally sent the control message (e.g., the control system 130, FIG. 1). An example process for transmitting the control message to the outpost agent is described further below with respect to FIG. 6.

At S440, IAM operation results data is received. In an embodiment, the IAM operation results data is received from the outpost agent to which the control message was transmitted. The IAM operation results data includes a control message response. Such a control message response may include, but is not limited to, an indication of success or failure, accompanying data resulting from the IAM operation (e.g., names and values given to objects), error information (e.g., error information when a failure occurs attempting to execute the IAM operation), a combination thereof, and the like. In a further embodiment, the IAM results data is scrubbed of any secret information such as, but not limited to, secrets. In some embodiments, secrets indicated in the control message response may be scrubbed by removing such secrets from the control message response before returning such a response among IAM operation results data. In a further embodiment, the scrubbed secrets are replaced with secret identifiers which may be utilized to identify their respective secrets but are incapable of being used to reconstruct their respective secrets.

At S450, a notification is generated based on the received IAM operation results data. The notification may indicate whether the IAM operation was successful, changes that were made as a result of the IAM operation, and the like.

Figure 5:
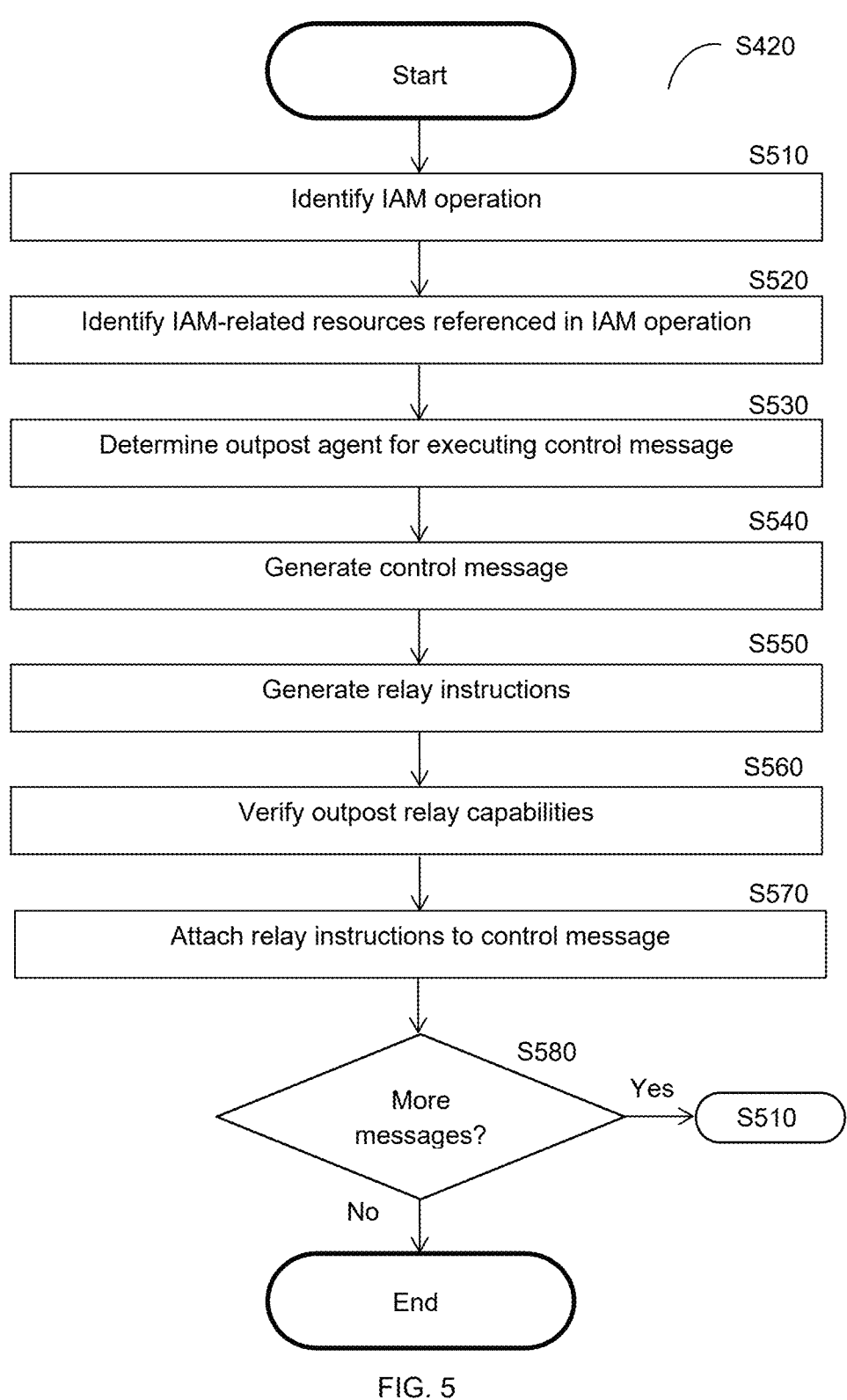
FIG. 5 is a flowchart illustrating a method for translating IAM operations into control messages according to an embodiment.

FIG. 5 is a flowchart S420 illustrating a method for translating an IAM operation into a control message according to an embodiment.

At S510, an IAM operation to be translated is identified.

At S520, one or more IAM-related resources referenced in the IAM operation are identified. Such IAM-related resources may include, but are not limited to, identity provider systems, secret vaults, both, and the like.

At S530, an outpost agent to be used for executing a control message for the IAM operation is identified. In an embodiment, the outpost agent to be used is determined based on the IAM-related resources referenced in the IAM operation. In a further embodiment, S530 includes checking an outpost inventory (e.g., the outpost inventory 313, FIG. 3) based on the IAM-related resources in order to determine an outpost agent that is capable of accessing the IAM-related resources.

In some embodiments, the outpost agent to be used for executing the control message cannot be communicated with directly by the system performing the method of FIG. 5 (e.g., the control system 130). In such an embodiment, the outpost inventory may be checked in order to identify an outpost agent which is capable of relaying the control message to the outpost agent to be used for executing the control message (i.e., the destination outpost agent which is a destination for the control message being relayed).

At S540, a control message is generated based on the identified IAM-related resources and the determined outpost agent. In an embodiment, the control message contains data utilized to execute the identified IAM operation. Such data may include, but is not limited to, a target IAM-related resource (e.g., an identity provider system or vault referenced in the IAM operation); an identifier of a secret, policy, vault, or identity on which the operation is to be executed; accompanying data for the operation (e.g., names and values to give to objects); a combination thereof, and the like. More specifically, when a control message is to be relayed between outpost agents (e.g., when the system sending the control message lacks direct communications with the outpost agent to execute a given control instruction), the relay instructions may indicate the destination outpost agent to which the control instruction should be relayed and which will execute the IAM operation.

At optional S550, relay instructions are generated. More specifically, when a destination outpost agent is not directly accessible to the system performing the method of FIG. 5, relay instructions indicating the destination outpost agent may be generated. In an embodiment, the generated relay instructions include pointers to data to be added to the relayed control message during relaying, an indication of a target outpost agent and a target relay queue to be used for relaying the control message to the destination outpost agent, both, and the like. The relay instructions allow the target outpost agent to relay the control message directly to the destination outpost agent without requiring further communication via a control system (e.g., the control system 130).

In some embodiments, the relay instructions further indicate additional data such as, but not limited to, data indicating that un-scrubbed control message responses containing secrets to be relayed to the destination outpost are to be relayed along with the control message. For example, the target outpost agent to which the control message with attached relay instructions is sent may perform an IAM operation which is needed to execute an IAM operation by the destination outpost agent (e.g., generating a new secret when the destination outpost agent is to execute an IAM operation for rotating secrets to replace an old secret with the new secret). In such an example, an un-scrubbed control message response including the newly generated secret may be relayed to the destination outpost agent along with the control message including executing a secrets rotation IAM operation in order to enable the destination outpost agent to use the newly generated secret for the secrets rotation IAM operation.

At optional S560, relay capabilities of the target outpost agent to which the control message will be sent are verified.

More specifically, S560 includes checking whether the target outpost agent has access to a relay through which the destination outpost agent can be reached (i.e., through which the control message can be relayed). To this end, in an embodiment, verifying the relay capabilities of the target outpost agent includes checking an outpost inventory to confirm whether the target outpost agent is associated with a relay queue through which control messages can be relayed to the destination outpost agent. In some embodiments, if the relay capabilities of the target outpost agent are not verified, a different target outpost agent may be selected.

At optional S570, the relay instructions are attached to the control message.

At S580, it is checked whether more control messages are to be generated and, if so, execution continues with S510; otherwise, execution terminates. In some embodiments, a control message may be generated for each IAM operation such that additional control messages may be generated until each IAM operation has a corresponding control message for executing the IAM operation.

Figure 6:
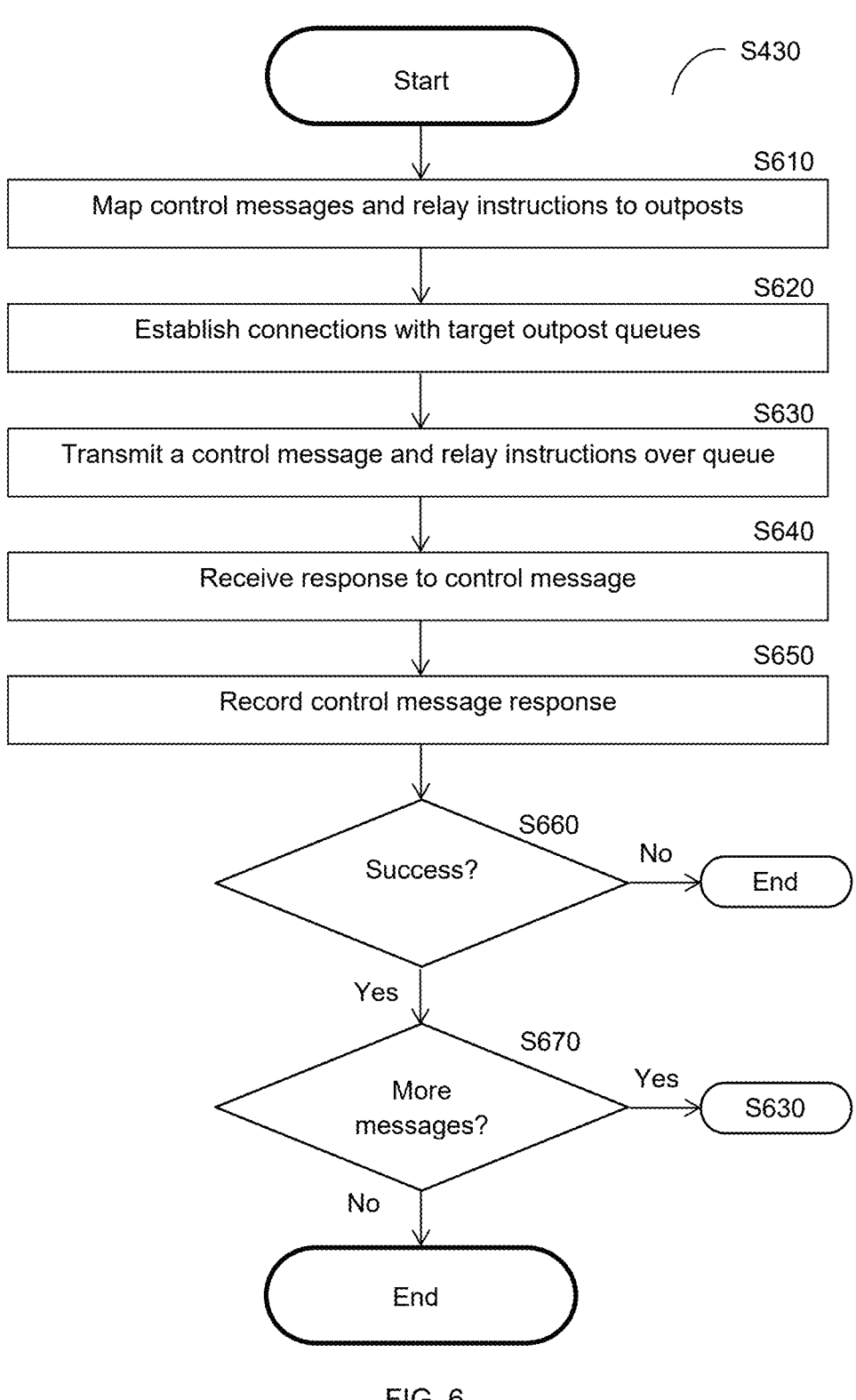
FIG. 6 is a flowchart illustrating a method for transmitting data to outposts using queues according to an embodiment.

FIG. 6 is a flowchart S430 illustrating a method for transmitting data to outposts using queues according to an embodiment.

At S610, control messages to be transmitted and relay instructions of those control messages are mapped to respective target outposts and their associated relay queues. More specifically, control messages and their respective relay instructions may be mapped to target outpost agents and relay queues to be used for relaying the control messages to their respective destination outpost agents.

At S620, connections are established to the relay queues among the mapped relay queues. The connections may be utilized to deliver the control messages to the relay queues in order to cause relaying of the control messages via their respective target outposts.

At S630, a control message with its attached relay instructions are transmitted via one of the relay queues to which a connection was established. More specifically, the control message is transmitted to the relay queue it is mapped to.

At S640, a response to the control message is received. The response may be received via the relay queue through which the control message was relayed. Such a control message response may include, but is not limited to, an indication of success or failure, accompanying data resulting from the IAM operation (e.g., names and values given to objects), error information (e.g., error information when a failure occurs attempting to execute the IAM operation), a combination thereof, and the like.

At S650, the control message response is recorded. In an embodiment, recording the control message response includes scrubbing certain data such as, but not limited to, secret data. In a further embodiment, scrubbed data may be replaced with identifying data (e.g., a secret identifier corresponding to a scrubbed secret).

At S660, it is checked if the control message was successful based on the received response. If so, execution continues with S670; otherwise, execution terminates.

At S670, it is checked if more control messages are to be transmitted and, if so, execution continues with S630; otherwise, execution terminates. It should be noted that FIG. 6 depicts an implementation in which control messages are transmitted in series, but any or all of the control messages may be transmitted in parallel without departing from the scope of the disclosure.

Figure 7:
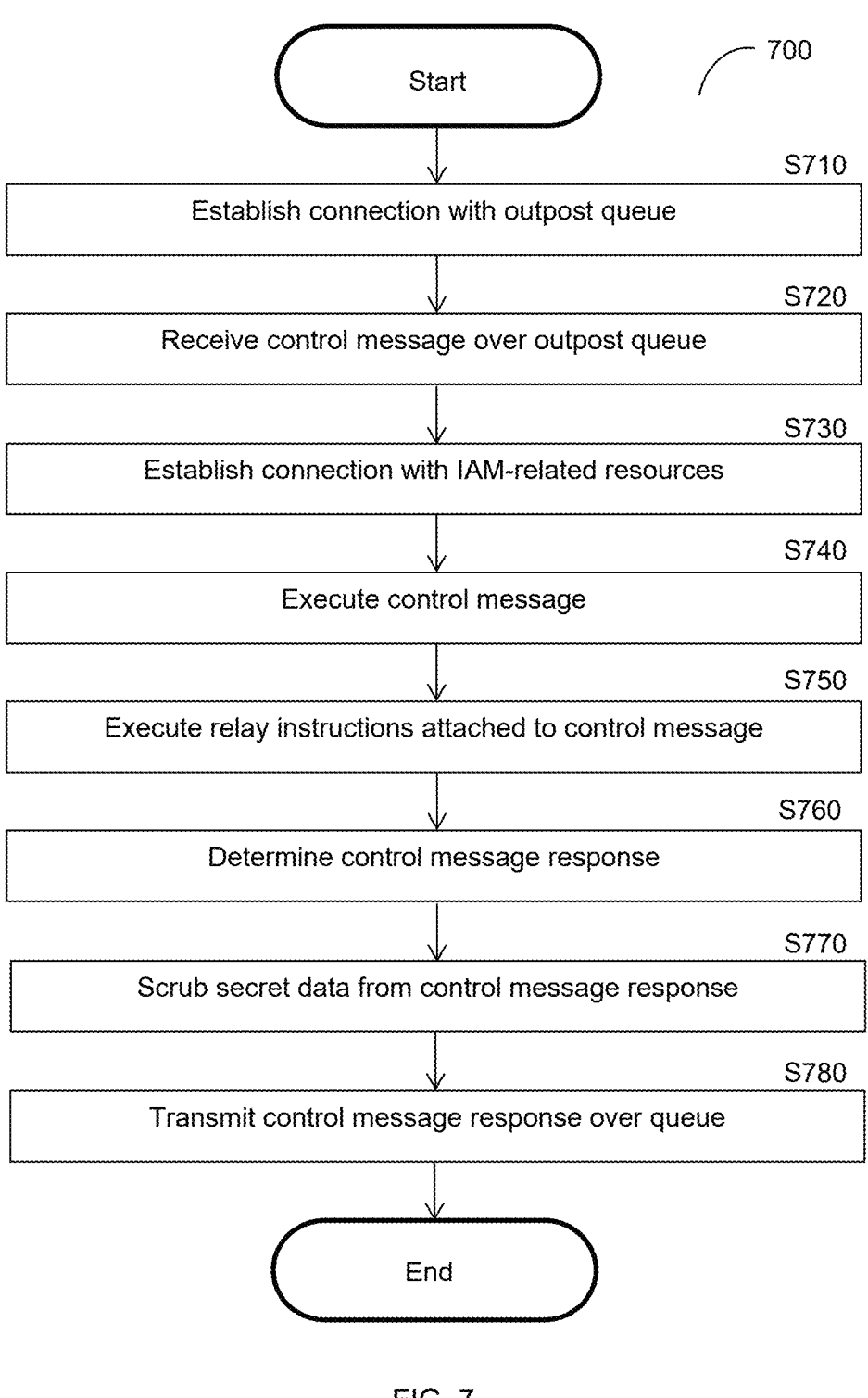
FIG. 7 is a flowchart illustrating a method for executing control messages according to an embodiment.

FIG. 7 is a flowchart 700 illustrating a method for executing control messages according to an embodiment. In an embodiment, the method is performed by one of the target systems 121, FIG. 1.

At S710, a connection is established with an outpost queue (e.g., the outpost queue 312, FIG. 3) of a control system (e.g., the control system 130) from which control messages to be executed are to be received.

At S720, a control message is received via the connected outpost queue.

At S730, a connection is established with one or more IAM-related resources referenced in the control message. Such IAM-related resources may be or may include, but are not limited to, an identity provider system, a secret vault, both, and the like.

At S740, the control message is executed. In an embodiment, executing the control message includes performing an IAM operation of the control message with respect to the connected IAM-related resources. When the control message includes relay instructions for relaying to another outpost agent, executing the control message may trigger execution of such relay instructions.

At optional S750, when the control message has attached relay instructions, the attached relay instructions are executed. Executing the relay instructions causes the control message to be relayed to another outpost agent (e.g., a destination outpost) for execution. An example process for executing relay instructions is described further below with respect to FIG. 8.

At S760, a control message response is determined based on results of executing the control message. When the control message is relayed using relay instructions at S750, S760 may include receiving IAM operation results data from the outpost agent to which the control message was relayed.

At S770, secret data is scrubbed from the determined control message response. In an embodiment, S770 includes deleting secret data in the determined control message response. In a further embodiment, secrets among such secret data may be replaced with respective secret identifiers corresponding to the deleted secrets. Such secret identifiers may be used to identify the secret in communications to a control system which originated the control message without revealing the underlying secret to that control system.

At S780, the control message response is transmitted to the control system which sent the control message via the connected outpost queue.

Figure 8:
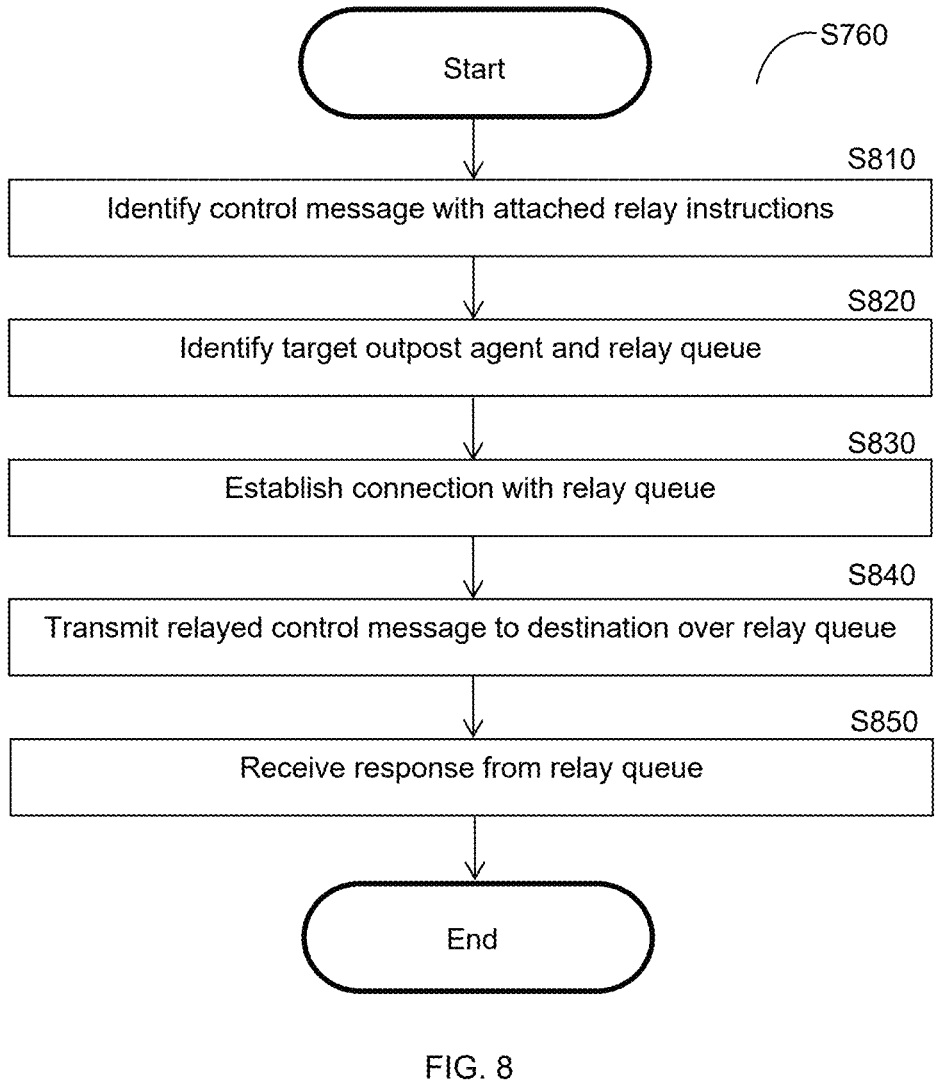
FIG. 8 is a flowchart illustrating a method for executing relay instructions according to an embodiment.

FIG. 8 is a flowchart S760 illustrating a method for executing relay instructions according to an embodiment.

At S810, a control message with attached relay instructions to be relayed is identified. In an embodiment, the attached relay instructions at least indicate the destination outpost agent to which the control message is to be relayed as well as a relay queue of a target outpost agent through which the control message is to be relayed.

At S820, a target outpost agent and a relay queue are identified based on the attached relay instructions.

At S830, a connection is established with the identified relay queue.

At S840, the relayed control message is transmitted to a destination outpost agent over the connected relay queue.

At S850, a response to the relayed control message is received over the connected relay queue.

Figure 9:
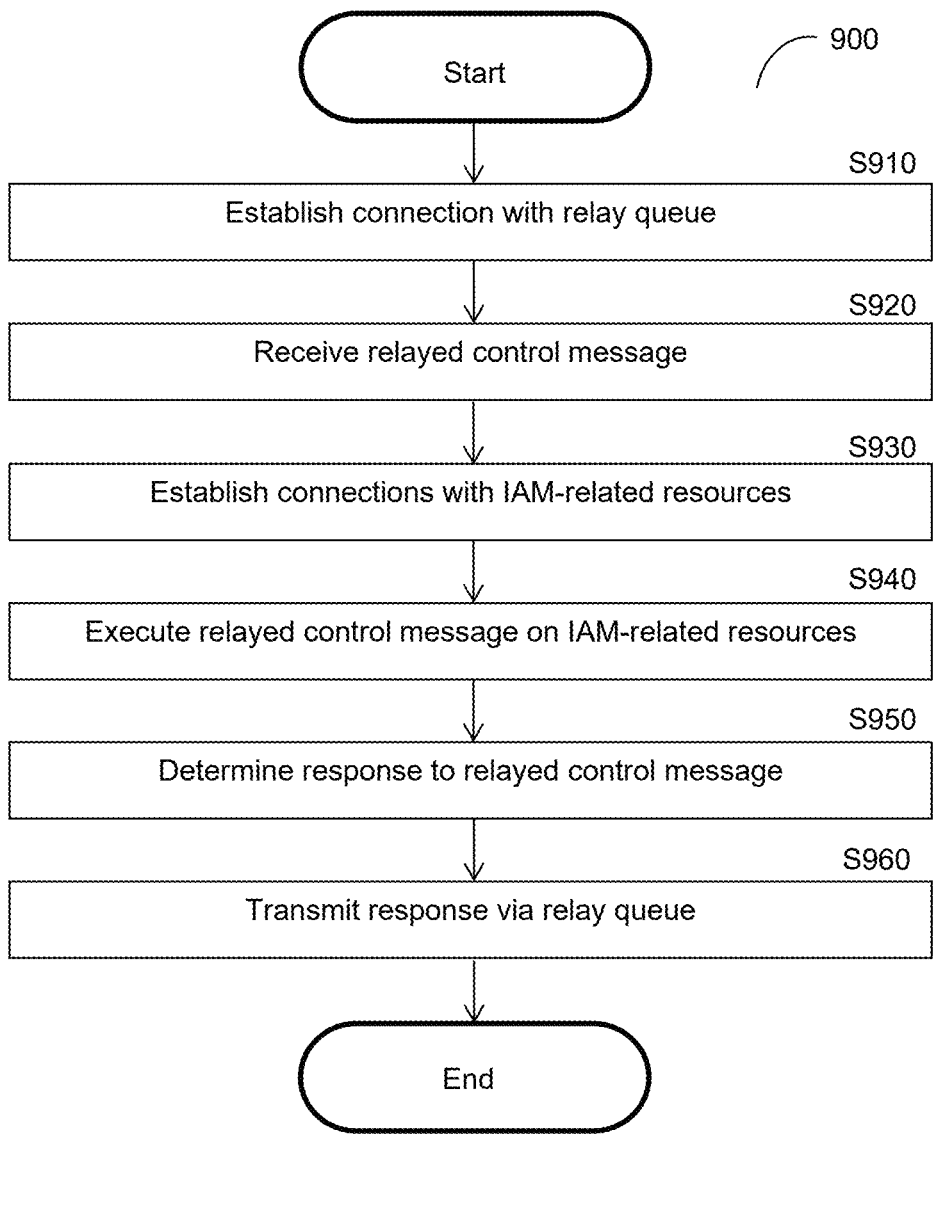
FIG. 9 is a flowchart illustrating a method for executing relayed control messages according to an embodiment.

FIG. 9 is a flowchart 900 illustrating a method for executing relayed control messages according to an embodiment. In an embodiment, the method is performed by one of the target systems 121, FIG. 1. More specifically, the method may be performed by a first target system (e.g., the target system 121-1) which receives a relayed control message from a second target system (e.g., the target system 121-2) over a relay queue (e.g., the relay queue 333), for example as depicted in FIG. 3.

At S910, a connection is established with a relay queue of an outpost agent acting as a target outpost agent through which control messages are to be relayed.

At S920, a relayed control message is received over the connected relay queue.

At S930, connections are established with one or more IAM-related resources referenced in the relayed control message.

At S940, the relayed control message is executed on the IAM-related resources. In an embodiment, executing the relayed control message includes executing an IAM operation with respect to the IAM-related resources.

At S950, a response to the relayed control message is determined based on results of executing the IAM operation.

At S960, the response to the relayed control message is transmitted via the connected relay queue. The response is therefore transmitted to the outpost agent which relayed the control message, and may be scrubbed of secret data before being transmitted back to the control system from which the relayed control message originated.

Figure 10:
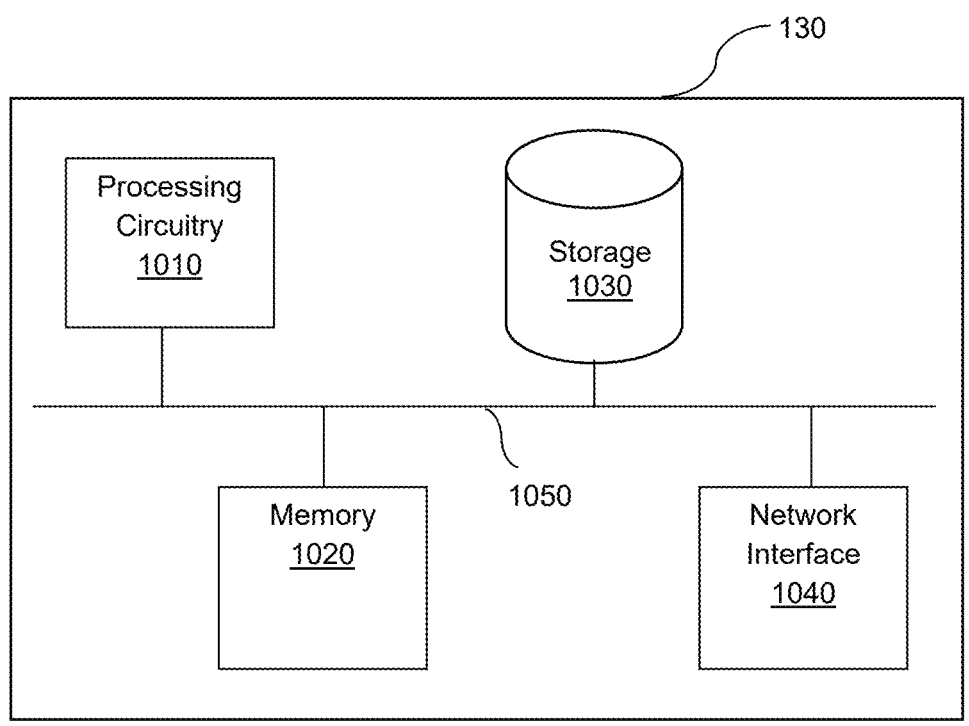
FIG. 10 is a schematic diagram of a control system according to an embodiment.

FIG. 10 is an example schematic diagram of a control system 130 according to an embodiment. The control system 130 includes a processing circuitry 1010 coupled to a memory 1020, a storage 1030, and a network interface 1040. In an embodiment, the components of the control system 130 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1140 allows the control system 130 to communicate with other systems, devices, components, applications, or other hardware or software components, for example as described herein.

It should be understood that the embodiments described herein are not limited to the specific architecture illustrated in FIG. 10, and other architectures may be equally used without departing from the scope of the disclosed embodiments.

Figure 11:
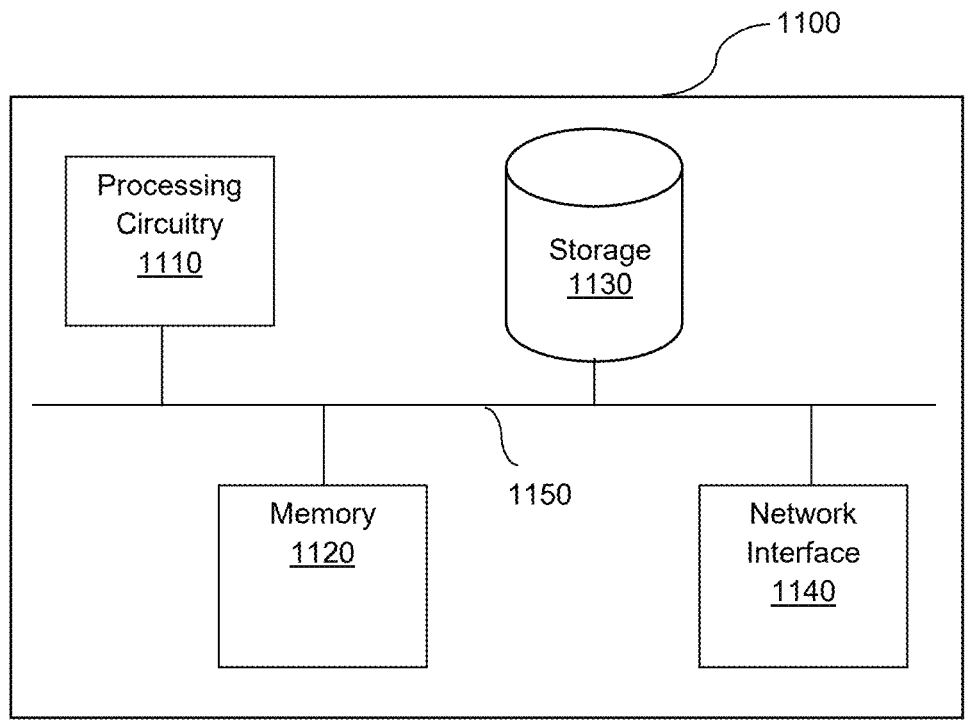
FIG. 11 is a schematic diagram of a hardware layer according to an embodiment.

FIG. 11 is an example schematic diagram of a hardware layer 1100 according to an embodiment. The hardware layer 1100 may be, for example, a hardware layer of a target system (e.g., one of the target systems 121, FIG. 1) and may be used to realize an outpost agent (e.g., one of the outpost agents 122, FIG. 1).

The hardware layer 1100 includes a processing circuitry 1110 coupled to a memory 1120, a storage 1130, and a network interface 1140. In an embodiment, the components of the hardware layer 1100 may be communicatively connected via a bus 1150.

The processing circuitry 1110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1120 may be volatile (e.g., random access memory, etc.), non-volatile (e.g., read only memory, flash memory, etc.), or a combination thereof.

In one configuration, software for implementing one or more embodiments disclosed herein may be stored in the storage 1130. In another configuration, the memory 1120 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1110, cause the processing circuitry 1110 to perform the various processes described herein.

The storage 1130 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1140 allows the hardware layer 1100 to communicate with other systems, devices, components, applications, or other hardware or software components, for example as described herein.

It should be understood that the embodiments described herein are not limited to the specific architecture illustrated in FIG. 11, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for secure operation execution, wherein the method is performed by a first agent, comprising:
   executing a control message generated by a system that is external to a computing environment, wherein the control message indicates at least a resource within the computing environment and an operation type of an operation to be performed via the resource, wherein executing the control message includes causing execution the operation via the resource in order to generate operation results data, wherein the operation is a secret rotation operation, wherein the control message has attached relay instructions, wherein the relay instructions indicate a second agent as a destination for the control message, wherein causing the execution of the operation further comprises:
   relaying the control message to the second agent, wherein the second agent executes the control message in order to execute the operation via the resource;
   identifying a relay queue for relaying the control message to the second agent;
   establishing a connection with the relay queue, wherein the control message is relayed to the second agent via the relay queue; and
   causing the operation to be performed by causing a first secret stored in the vault to be replaced with a second secret, wherein the second secret has a secret identifier indicated in the operation results data;
   removing the second secret from a control message response in order to create a secured control message response, wherein the control message response is generated based on the operation results data, wherein removing the second secret from the control message response further comprises replacing an instance of the second secret in the control message response with the secret identifier; and
   transmitting the secured control message response to the system.

2. The method of claim 1, wherein the relay instructions further include instructions which cause the operation results data to be returned to the first agent when the relay instructions are executed by the second agent.

3. The method of claim 1, wherein the operation results data is received from the second agent via the relay queue.

4. The method of claim 1, wherein the method is performed by an agent deployed in the computing environment, wherein the agent is configured such that authentication credentials used by the agent to access the resource remain within a perimeter of the computing environment.

5. The method of claim 1, wherein the operation is performed with respect to a secret having a secret identifier, wherein removing the secret from the control message response further comprises:
   replacing an instance of the secret in the control message response with the secret identifier.

6. A non-transitory computer readable medium having stored thereon instructions for causing a processing circuitry to execute a process, the process comprising:
   executing a control message generated by a system that is external to a computing environment, wherein the control message indicates at least a resource within the computing environment and an operation type of an operation to be performed via the resource, wherein executing the control message includes causing execution the operation via the resource in order to generate operation results data, wherein the operation is a secret rotation operation, wherein the control message has attached relay instructions, wherein the relay instructions indicate a second agent as a destination for the control message, wherein causing the execution of the operation further comprises:

relaying the control message to the second agent, wherein the second agent executes the control message in order to execute the operation via the resource;

identifying a relay queue for relaying the control message to the second agent;

establishing a connection with the relay queue, wherein the control message is relayed to the second agent via the relay queue; and causing the operation to be performed by causing a first secret stored in the vault to be replaced with a second secret, wherein the second secret has a secret identifier indicated in the operation results data;

removing the second secret from a control message response in order to create a secured control message response, wherein the control message response is generated based on the operation results data, wherein removing the second secret from the control message response further comprises replacing an instance of the second secret in the control message response with the secret identifier; and transmitting the secured control message response to the system.

7. A system for secure operation execution, comprising:

a processing circuitry, wherein the system is a first system deployed within a computing environment; and a memory, the memory containing instructions that, when executed by the processing circuitry, configure the first system to perform the following steps via a first agent:

executing a control message generated by a system that is external to a computing environment, wherein the control message indicates at least a resource within the computing environment and an operation type of an operation to be performed via the resource, wherein executing the control message includes causing execution the operation via the resource in order to generate operation results data, wherein the operation is a secret rotation operation, wherein the control message has attached relay instructions, wherein the relay instructions indicate a second agent as a destination for the control message, wherein the system is further configured to:

relay the control message to the second agent, wherein the second agent executes the control message in order to execute the operation via the resource;

identify a relay queue for relaying the control message to the second agent;

establish a connection with the relay queue, wherein the control message is relayed to the second agent via the relay queue;

cause the operation to be performed by causing a first secret stored in the vault to be replaced with a second secret, wherein the second secret has a secret identifier indicated in the operation results data;

remove the second secret from a control message response in order to create a secured control message response, wherein the control message response is generated based on the operation results data, wherein removing the second secret from the control message response further comprises replacing an instance of the second secret in the control message response with the secret identifier; and transmit the secured control message response to the system.

8. The system of claim 7, wherein the relay instructions further include instructions which cause the operation results data to be returned to the first agent when the relay instructions are executed by the second agent.

9. The system of claim 7, wherein the operation results data is received from the second agent via the relay queue.

10. The system of claim 7, wherein the system is configured to execute the control message via an agent deployed in the computing environment, wherein the agent is configured such that authentication credentials used by the agent to access the resource remain within a perimeter of the computing environment.

11. The system of claim 7, wherein the operation is performed with respect to a secret having a secret identifier, wherein the system is further configured to:

replace an instance of the secret in the control message response with the secret identifier.

12. The system of claim 7, wherein the operation is a secret rotation operation, wherein the resource indicated in the control message is a vault, wherein the secret is a second secret, wherein the system is further configured to:

cause the secret rotation operation to be performed by causing a first secret stored in the vault to be replaced with the second secret, wherein the second secret has a secret identifier indicated in the operation results data, wherein removing the secret from the control message response further comprises:

replace an instance of the second secret in the control message response with the secret identifier.

* * * * *